United States Patent [19]
Kishino et al.

[11] 3,758,647
[45] Sept. 11, 1973

[54] HALOGEN-SUBSTITUTED O,O-DIALKYL O-CYANOPHENYL PHOSPHATES

[75] Inventors: Shigeo Kishino; Yasuo Yamada; Akio Kudamatsu; Toyohiko Kume, all of Tokyo, Japan

[73] Assignee: Bayer Aktiengesellschaft, Leverkusen, Germany

[22] Filed: Dec. 1, 1970

[21] Appl. No.: 94,211

[30] Foreign Application Priority Data
Dec. 4, 1969   Japan............................44/96807

[52] U.S. Cl................................. 260/940, 424/210
[51] Int. Cl............................ C07f 9/12, A01n 9/36
[58] Field of Search.................................... 260/940

[56] References Cited
UNITED STATES PATENTS
3,250,826   5/1966   Tamura et al...................... 260/940

*Primary Examiner*—Lewis Gotts
*Assistant Examiner*—Anton H. Sutto
*Attorney*—Burgess, Dinklage & Sprung

[57] ABSTRACT

Halogen-substituted O,O-dialkyl O-cyanophenyl phosphates, i.e. O,O-dialkyl O-cyanophenyl phosphates containing one or two chlorine atoms on one of the alkyl groups and optionally containing a halogen atom on the phenyl ring which possess fungicidal, insecticidal and acaricidal properties.

16 Claims, No Drawings

HALOGEN-SUBSTITUTED O,O-DIALKYL O-CYANOPHENYL PHOSPHATES

The present invention relates to and has for its objects the provision of particular new halogen-substituted O,O-dialkyl O-cyanophenyl phosphates, i.e. O,O-dialkyl O-cyanophenyl phosphates containing 1 or 2 chlorine atoms on one of the alkyl groups and optionally containing a halogen atom on the phenyl ring which possess fungicidal, insecticidal and acaricidal properties, active compositions in the form of mixtures of such compounds with solid and liquid dispersible carrier vehicles, and methods for producing such compounds and for using such compounds in a new way, especially for combating fungi and insects with other and further objects becoming apparent from a study of the within specification and accompanying examples.

The Specifications of Japanese Patent Publications Nos. 13400/63 and 279/67 disclose that chloromethyl-O-alkyl-O-cyanophenylphosphonates (or phosphonothionoates) of the formula

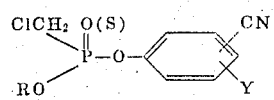

in which
R is a lower alkyl group and
Y is hydrogen, alkyl, methoxy or halogen,
are insecticides with low toxicity to warm-blooded animals.

The specification of Japanese Patent Publication No. 1839/63 discloses that O,O-dialkyl-O-(4-cyanophenyl)phosphates of the formula

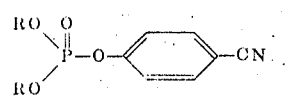

in which
R is an alkyl group,
are insecticides with low toxicity to warm-blooded animals.

It has now been found, in accordance with the present invention that the particular new dialkyl cyanophosphates of the formula

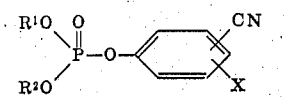

in which
$R^1$ stands for a lower alkyl group,
$R^2$ stands for lower alkyl group substituted by one or two chlorine atoms, and
X stands for a hydrogen or halogen atom,
exhibit strong fungicidal and insecticidal activity, which are not exhibited by known compounds of analogous structure.

It has been furthermore found, in accordance with the present invention, that the compounds of formula (III) above may be produced by the process which comprises reacting a phosphoric acid diester halide of the formula

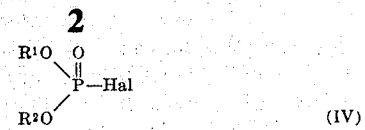

with a phenol or phenolate of the formula

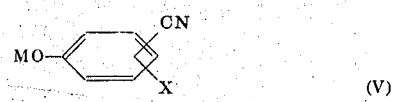

in which formulae
$R^1$, $R^2$ and X have the meanings given above,
M stands for a hydrogen atom, a metal equivalent or an ammonium group, and
Hal stands for a halogen atom, preferably a chlorine atom.

Surprisingly, the compounds of this invention exhibit excellent biological activities of such a broad range that they are effective both as fungicides and insecticides, and they are of great practical utility. Further, since they are free of harmful heavy metals, they do not cause any problem of such poisons remaining in crops. Furthermore, they do not exhibit acute toxicity which is seen in parathion and the like; in fact they have a low toxicity.

They are especially characterized by excellent fungicidal activity and growth-inhibitive activity against fungi and bacteria which infect plants and can be used for controlling diseases caused by various fungi of a broad range. Accordingly, they may be used advantageously as agricultural chemicals. The instant compounds therefore represent a valuable contribution to the art.

Advantageously, in accordance with the present invention, in the various formulae herein:
$R^1$ represents an alkyl of one to four carbon atoms, namely methyl, ethyl, n- or isopropyl, or n-, iso-, sec- or tert-butyl, especially a straight and branched chain alkyl group such as methyl, ethyl, and n- or iso-propyl,
$R^2$ represents an alkyl group of one to four carbon atoms substituted by one or two chlorine atoms such as chloromethyl, 2-chloro-ethyl, 1-chloromethylethyl, 1-chloromethyl-2-chloro-ethyl, 1-methyl-3-chloropropyl and 1-methyl-2-chloropropyl, especially 1-chloromethylethyl, 1-chloromethyl-2-chloroethyl and 1-methyl-3-chloropropyl,
X represents a hydrogen atom or a halogen atom such as chlorine, bromine, fluorine or iodine, especially a chlorine or bromine atom, and
M represents a hydrogen atom, an ammonium group or an alkali metal such as sodium, potassium or lithium.

The reaction course is illustrated by the following reaction scheme:

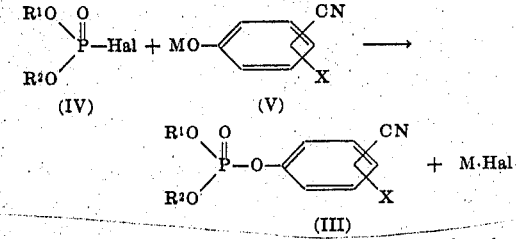

The starting materials which may be used are clearly characterized by formulae (IV) and (V) above, and are well known.

As suitable starting phosphoric acid diester halides of the formula (IV) there may be mentioned phosphoric acid diester chlorides having an O-methyl-, O-ethyl-, O-n-propyl- or O-isopropyl- group and an O-1-chloromethylethyl-, O-1-chloromethyl-2-chloroethyl- or O-1-methyl-3-chloropropyl- group, and the like.

Phenols of the formula (V), include 2-cyanophenol, 4-cyanophenol, 2-cyano-4-chlorophenol, 2-cyano-4-bromophenol, 2-chloro-4-cyanophenol, and the like. Salts of these phenols with ammonium or a metal, preferably sodium or potassium, may be also used for the reaction.

The synthesis of the active compounds of the present invention is preferably carried out in the presence of a solvent or diluent. Any inert solvent may be used for this purpose. Particularly good results, however, are obtainable with the use of an aliphatic or aromatic hydrocarbon (which may be chlorinated) such as methylene chloride; di-, tri- or tetra-chloroethylene, chloroform, carbon tetrachloride, benzine, benzene, chlorobenzene, toluene or a xylene. Other suitable solvents include ethers such as diethyl- and di-n-butyl-ethers, dioxane and tetrahydrofuran; low molecular weight aliphatic ketones and nitriles such as acetone, methylethylketone, methylisopropylketone, methylisobutylketone, acetonitrile and propionitrile; and low boiling aliphatic alcohols such as methanol, ethanol and isopropanol.

The above synthesis of the active compounds of this invention, especially when M is hydrogen, may be performed in the presence of an acid-binder. Any of the compounds which are usually used as acid-binders, for instance, hydroxides, carbonates, bicarbonates and alcoholates of alkali metals, and organic bases (particularly aliphatic, aromatic and heterocyclic amines such as triethylamine, dimethylaniline and pyridine) may be used in the reaction.

When the reaction is effected in the absence of an acid-binder, the intended product of high purity can be obtained in good yield by forming a salt, preferably an ammonium or alkali metal salt, of the appropriate phenol in advance and then reacting the salt with the appropriate phosphoric acid diester halide.

The above-mentioned synthesis may be effected at a temperature within a broad range. Generally, the reaction is carried out at a temperature of from −20°C. to the boiling point of the reaction mixture. Preferably, the reaction is effected at 0° to 100°C. or the boiling point of the mixture, whichever is the lower. It is preferable to carry out the reaction under atmospheric pressure, but it is possible to conduct the reaction under reduced or elevated pressure.

The phosphoric acid esters of this invention have an insect-killing property and may be utilized for controlling various harmful insects such as sucking insects, biting insects and harmful plant parasites. They are effective as insecticides against insects harmful to agriculture such as insects belonging to the orders Coleoptera, Lepidoptera, Aphidae, Orthoptera, Isoptera, Acarina and Nematodes spider mites and harmful nematodes living in soil. Thus, they can be used as agents for protecting plants from these insects. The compounds of this invention exhibit excellent residual build-up when used as insecticides against sanitarily harmful insects and insects harmful to stored grain, such as flies, aphids, mosquitoes and gnats.

As fungicides, they can be used effectively for eradicating diseases of plants caused by Archimycetes, Phycomycetes, Ascomycetes, Basidiomycetes, Fungi Imperfecti and other fungi. They are effective in exterminating fungi causing diseases in rice plants, fruit trees and vegetables.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, dimethylnaphthalene, aromatic naphthas, etc.), halogenated, especially chlorinated, aromatic hydrocarbons (e.g. chlorobenzenes), paraffins (e.g. petroleum fractions), chlorinated aliphatic hydrocarbons (e.g. methylene chloride, carbon tetrachloride, ethylene chloride, etc.), cycloaliphatic hydrocarbons (e.g. cyclohexane), alcohols (e.g. methanol, ethanol, propanol, butanol, etc.), ethers,ether-alcohols (e.g. glycol monomethyl ether, etc.), amines (e.g. ethanol-amine, etc.), amides (e.g. dimethyl formamide, etc.), sulfoxides (e.g. dimethyl sulfoxide, etc.), ketones (e.g. acetone, methylethylketone, cyclohexanone, etc.), strongly polar solvents such as acetonitrile, and/or water; as well as inert dispersible finely divided solid carriers, such as ground natural minerals (e.g. kaolins, alumina, silica, chalk, i.e. calcium carbonate, talc, kieselguhr, montmorillonite, clay, diatomaceous earth, attapulgite, etc.), and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

As will be appreciated by the artisan, the active compounds according to the instant invention may be employed alone or in the form of mixtures with one another and/or with such solid and/or liquid dispersible carrier vehicles and/or with other known compatible active agents, especially plant protection agents, such as herbicides, insecticides, acaricides and nematocides, or fungicides, bactericides, plant growth regulators, antibiotics, soil disinfectants, including phenoxy compounds, chlorophenol compounds, carbamates, diphenyl ethers, urea compounds, triazine compounds, and other known agricultrual chemicals and/or fertilizers, etc., if desired, or in the form of particular dosage preparations for specific application made therefrom, such as solutions, emulsions, suspensions, powders, pastes, and graules which are thus ready for use. They may also be used as aerosols using as propellants gaseous diluents or carriers such as freon.

As concerns commercially marketed preparations, these generally contemplate carrier composition mixtures in which the active compound is present in an amount substantially between about 0.1 and 95 percent by weight, and preferably 0.5 and 90 percent by weight, of the mixture, whereas carrier composition mixtures suitable for direct application or field application generally contemplate those in which the active compound is present in an amount substantially between about 0.0001 – 20 percent, preferably 0.01–5 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95 percent, and preferably 0.01–95 percent, by weight of the mixture.

In particular, the amount of active compound applied per unit area varies according to the purpose intended, i.e. the effect desired, and the mode of application. In general, quantities of substantially between about 15–1000 g of active compound per 10 ares, preferably 40–600 g per 10 ares, are applied.

The active compounds can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of the active compound or even the 100 percent active substance alone, e.g. about 20–100 percent by weight of the active compound.

Furthermore, the present invention contemplates methods of selectively killing, combatting or controlling pests, and more particularly undesired fungi and insects, which comprise applying to such pests, i.e. at least one of correspondingly (a) such fungi, (b) such insects and (c) the corresponding habitat thereof, i.e. the locus to be protected, a pesticidally, i.e. a correspondingly fungicidally or insecticidally effective or toxic amount of the particular compound of the invention alone or together with a carrier vehicle as noted above. The instant formulations or compositions are applied in the usual manner, for example by spraying, atomizing, scattering, dusting, watering, sprinkling, seed dressing, and the like.

It will be realized, of course, that in connection with the fungicidal and insecticidal use of the instant compounds, the concentration of the particular active compound utilized in admixture with the carrier vehicle will depend upon the intended application and may be varied within a fairly wide range depending upon the weather conditions, the locus to be protected, the purpose for which the active compound is used, e.g. for fungicidal or arthropodicidal or nematocidal effect, and the plants which are to be controlled or protected. Therefore, in special cases, it is possible to go above or below the aforementioned concentration ranges and amounts per unit area.

The following illustrate, without limitation, examples of formulations which may be used in accordance with the present invention:

FORMULATION A 15 parts by weight of compound 3 of Table 5, 80 parts by weight of a mixture of diatomaceous earth and clay (1:5) and 5 parts by weight of an emulsifier (i.e. polyoxyethylene alkylaryl ether) are mixed and crushed to prepare a wettable powder. This formulation may be diluted with water to the desired concentration and then be used as a ready-to-use preparation.

FORMULATION B 30 parts by weight of compound 4 of Table 5, 30 parts by weight of xylene, 30 parts by weight of Kawakasol (an aromatic hydrocarbon with a boiling range of 150° to 200°C.) and 10 parts by weight of the emulsifier Sorpol (i.e. polyoxyethylene alkylaryl ether) are mixed and stirred to prepare an emulsifiable concentrate. This formulation may be diluted with water to the desired concentration and then used as a ready-to-use-preparation.

FORMULATION C

To a mixture consisting of 10 parts by weight of compound 6 of Table 5, 10 parts by weight of bentonite, 78 parts by weight of a mixture of talc and clay (1:3) and 2 parts by weight of lignin sulfate, 25 parts by weight of water are added and the mixture is firmly kneaded. It is finely cut into granules of 0.5 to 1.5 mm diameter by means of a granulating machine. The granules are then dried at a temperature between 40° to 50°C to obtain a granular formulation. This formulation may directly be applied to the soil.

FORMULATION D 2 parts by weight of compound 12 of Table 5 and 98 parts by weight of a mixture of talc and clay (1:3) are mixed and crushed to prepare a dust. This formulation may directly be used as a ready-to-use-preparation.

The effectiveness of the novel compounds of this invention is illustrated, without limitation, by the following Examples:

EXAMPLE 1 TEST AGAINST RICE BLAST (*PIRICULARIA ORYZAE*)/(POT TEST)

Preparation of a Sample Composition
Solvent: one part by weight of acetone.
Dispersing agent: 0.05 part by weight of sodium oleate.
Other additive: 0.2 part by weight of gelatin.

Water: 98.75 parts by weight.

The active compound, in an amount sufficient to give the predetermined concentration in the ready-to-use preparation, was mixed with the above amount of the solvent to form a concentrated emulsifiable liquor and it was then diluted with the above amount of water containing the above amount of the dispersing agent and gelatin to form a sample composition.

Test Procedure

Preventive and curative effect tests:

Rice plants (jukkoku variety) was cultivated in a pot of a 12 cm diameter, and the composition containing the active compound at the predetermined concentration was sprayed in an amount of 50 ml per 4 pots.

Half of the chemically sprayed rice plant was kept in a chamber maintained at 25°C and a relative humidity of 100 percent for 2 days from the next day after the chemical spraying, and the remaining half was kept in the same chamber for 2 days from the fourth day after the chemical spraying. While in the said chamber the rice plant was inoculated twice with a suspension of spores of cultured spores of Piricularia oryzae by spraying. From the results of the infection made the next day after the chemical spraying, the protective effect can be evaluated, and from the results of the infection made the fourth day after the chemical spraying, the residual effect can be evaluated.

Seven days after inoculation, the degree of infestation was determined by applying a scale ranging from 0 to 5, and the protective value of each particular active compound against *Piricularia oryzae* was determined in accordance with the formula below.

At the same time, the phytotoxicity against rice plants was determined.

| Degree of infestation | Infested area of leaf in % of total leaf |
|---|---|
| 0 | 0 % |
| 0.5 | 0–2 % |
| 1 | 2–5 % |
| 2 | 5–10 % |
| 3 | 10–20 % |
| 4 | 20–40 % |
| 5 | 40 or more % |

Protective value = 100 − (Degree of infestation of treated plants)/(Degree of infestation of non-treated plants) × 100

The symbol "−" in the following Table 1 means that the chemical did not adversely affect the growth of the rice plant.

TABLE 1
Test result against rice blast (Piricularia oryzae)

| Compound No. | Active component concentration (ppm) | Protective value A | Protective value B | Phytotoxicity |
|---|---|---|---|---|
| 1 | 250 | 84 | | — |
|   | 500 | 96 | 55 | — |
| 2 | 250 | 100 | | — |
|   | 500 | 100 | 68 | — |
| 3 | 250 | 90 | | — |
|   | 500 | 98 | 62 | — |
| 4 | 250 | 100 | 60 | — |
|   | 500 | 100 | 82 | — |
| 5 | 250 | 100 | 60 | — |
|   | 500 | 100 | 82 | — |
| 6 | 250 | 86 | | — |
|   | 500 | 100 | 77 | — |
| 7 | 250 | 84 | | — |
|   | 500 | 92 | 52 | — |
| 8 | 250 | 100 | 56 | — |
|   | 500 | 100 | 75 | — |
| 9 | 250 | 100 | 52 | — |
|   | 500 | 100 | 75 | — |
| 10 | 250 | 74 | | — |
|   | 500 | 88 | | — |
| 11 | 250 | 82 | | — |
|   | 500 | 100 | 80 | — |
| 12 | 250 | 100 | 65 | — |
|   | 500 | 100 | 96 | — |
| 13 | 250 | 96 | 59 | — |
|   | 500 | 100 | 88 | — |
| 14 | 250 | 86 | | — |
|   | 500 | 92 | 74 | — |
| 15 | 250 | 94 | 76 | — |
|   | 500 | 100 | 88 | — |
| 16 | 250 | 86 | | — |
|   | 500 | 100 | 78 | — |
| 17 | 250 | 82 | | — |
|   | 500 | 100 | 72 | — |
| III-a (Comparison) | 250 | 12 | | — |
|   | 500 | 46 | 0 | — |
| IBP (Commercially available product as a comparison) | 480 | 85 | 42 | — |
| Untreated control | — | 0 | 0 | — |

Notes:
1. The compound numbers correspond to those in Example 3 and Table 5.
2. A means the test result of preventive effect. B means the test result of curative effect.
3. III-a denotes O,O-diethyl-O-(p-cyanophenyl)phosphate (a compound of the formula (III) and disclosed in the specification of Japanese Patent Publication No. 18398/63.)
4. IBP denotes O,O-diisopropyl-S-benzylthiophosphate.

EXAMPLE 2 TEST AGAINST VARIOUS KINDS OF PLANT PATHOGENIC FUNGI

Test Procedure

The active compound of this invention was incorporated in a potato agar culture medium to obtain the determined concentration of the active compound. Then

TABLE 2.—EFFECTS AGAINST VARIOUS PATHOGENIC FUNGI OF PLANTS

| Compound No. | Active compound concentration p.p.m. | Piricularia oryzae (Blast) (rice plants) | Pellicularia sasakii (Sheath blight) (rice plants) | Xanthomonas oryzae (Bacterial oryzae leaf blight) (rice plants) | Collelotrichum lagenarium (Anthranose) (melons) | Alternaria kikuchiana (Black spot) (pears) | Diaporthe citri (Melanose) (fruit) | Glomerella cingulata (Ripe rot) (grapes) | Sclerotinia cinerea (Brown rot) (peach) |
|---|---|---|---|---|---|---|---|---|---|
| 3 | 800 | 0 | 0 | 0 | 0 | 0 | 0 | 0 | 0 |
|   | 200 | 0 | 0.5 | 0.5 | 0.5 | 0.5 | 1 | 1 | 0.5 |
|   | 50 | 1 | 1 | 1 | 1 | 1.5 | 1 | 1.5 | 1 |
|   | 12.5 | 3.5 | 4 | 4 | 4 | 3 | 3 | 3 | 3.5 |
| 4 | 800 | 0 | 0 | 0 | 0 | 0 | 0 | 0 | 0 |
|   | 200 | 0 | 0 | 0.25 | 0.5 | 0 | 0.5 | 0.5 | 0 |
|   | 50 | 0 | 0.5 | 1 | 1.5 | 1.5 | 1 | 1 | 0.5 |
|   | 12.5 | 2 | 3 | 2 | 3 | 2 | 3 | 3 | 3 |
| Untreated control | | 5 | 5 | 5 | 5 | 5 | 5 | 5 | 5 |

Notes.—(1) The compound numbers correspond to those in Example 5 and Table 5. (2) Each value in the table is an average value of those of 4 Petri dishes. (3) Degree of illfungal growth: 0=no growth; 1=20% of the non-treated mycerial area; 2=40% of the non-treated mycerial area; 3=60% of the non-treated mycerial area; 4=80% of the non-treated mycerial area; 5=the same growth as the non-treated area.

the medium was put into a Petri dish of 9 cm diameter and solidified. The medium was inoculated with the plant pathogenic fungi below, and they were cultured at 27°C for 5 days. Then the conditions of the growth of the fungi were examined and the activity of the compound was rated on a scale from 0 (no growth of the fungi) to 5 (the fungi grew in a manner similar to the untreated control).

EXAMPLE 3 TEST AGAINST THE ADULT HOUSE FLY (*MUSCA DOMESTICA*)

Preparation of a Sample Composition:
Solvent: 3 parts by weight of acetone
Emulsifier: 1 part by weight of alkyl aryl polyglycol ether A suitable preparation of active compound was prepared by mixing 1 part by weight of the active compound with the above amount of the solvent containing the above amount of the emulsifier, and the resulting concentrated emulsifiable liquor was diluted with water to obtain the determined concentration of the active compound.

Test Procedure

A sheet of filter paper was spread in a Petri dish of 9 cm diameter and 1 ml of the above-mentioned diluted liquor containing the active compound at the determined concentration was poured into the dish. Then 10 mature female adult house flies were put into the dish and the dish was kept for 24 hours in a thermostat chamber maintained at 28°C. The number of the dead insect was counted and the mortality ratio was calculated. A mortality ratio of 100 percent means that all the insects were killed and a mortality ratio of 0 percent means that all the insects survived.

TABLE 3

Results of tests against the adult house fly

| Compound No. | Mortality ratio (%) Active compound concentration | |
|---|---|---|
| | 0.1% | 0.01% |
| 1 | 100 | 80 |
| 2 | 100 | |
| 3 | 100 | 80 |
| 4 | 100 | 100 |
| 5 | 100 | 100 |
| 6 | 100 | 100 |
| 7 | 100 | 100 |
| 8 | 100 | 60 |
| 9 | 100 | |
| 11 | 80 | 30 |
| 12 | 100 | 80 |
| 13 | 100 | 50 |
| 14 | 100 | |
| III-a (Comparison) | 80 | |
| DDT (Commercially available product as a comparison) | 100 | 10 |
| Untreated (control) | 0 | 0 |

Notes:
1. The compound numbers correspond to those in Example 5 and Table 5.
2. III-a denotes O,O-diethyl-O-(p-cyanophenyl)phosphate as described in Note (3) of Table 1.

EXAMPLE 4

Test against mosquito (*Culex molestus*) larvae:
Test Procedure

A Petri dish of 9 cm diameter was charged with 100 ml of an aqueous dilution of the active compound prepared in the same manner as Example 3, at the determined concentration and 25 of fourth-instar mosquito larvae were put into the dish. The dish was kept in a thermostat chamber maintained at 28°C for 24 hours. Then the number of dead larvae was counted and the mortality ratio was calculated. A mortality ratio of 100 percent means that all the larvae were killed and a mortality ratio of 0 percent means that all the larvae survived.

TABLE 4

Results of tests against mosquito larvae

| Compound No. | Active compound concentration ppm | Mortality ratio (%) |
|---|---|---|
| 4 | 1 | 100 |
| 5 | 1 | 100 |
| 6 | 1 | 100 |
| 7 | 1 | 70 |
| 9 | 1 | 60 |
| 11 | 1 | 100 |
| 14 | 1 | 88 |
| 15 | 1 | 100 |

Note: The compound numbers correspond to those in Example 5 and Table 5.

The following further examples are set forth to illustrate, without limitation, the manner of producing the instant compounds according to the present invention:

EXAMPLE 5

11.9 g of 2-cyanophenol and 10.1 g of triethylamine were dissolved in 150 ml of benzene, and 22.1 g of O-ethyl-O-(1-chloromethylethyl)phosphoryl chloride were added dropwise to the solution at 15°–20°C. under stirring. The stirring was continued for about 1 hour at 20°–30°C. and for another hour at 50°–60°C. to complete the reaction. The reaction mixture was washed with water, 1% hydrochloric acid, and 2% aqueous potassium carbonate, and dried over anhydrous sodium sulphate; this was followed by removal of benzene by distillation and distillation under reduced pressure. There were obtained 23 g of a colorless liquid, O-ethyl-O-(1-chloromethylethyl)-O-(2-cyanophenyl)phosphate of the formula

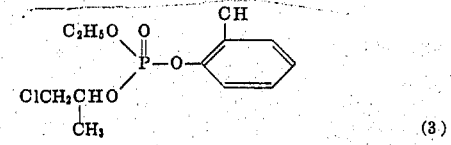

(3)

The product was characterized by a boiling point of 160°–162°C./0.1 mm Hg and a refractive index $n_D^{20}$ of 1.4974.

The following compounds could be obtained in an analogous manner:

TABLE 5

| | | Physical properties | |
|---|---|---|---|
| | Formula | B.P. °C./mm.Hg. | (Refractive index) |
| Compound No.: | | | |
| 1 | $CH_3O\!\!-\!\!\underset{ClCH_2CHO}{\underset{|}{\overset{O}{\overset{\|}{P}}}}\!\!-\!\!O\!\!-\!\!C_6H_4\!\!-\!\!CN$ (ortho) with $CH_3$ | 163–164° C./0.6 | ($n_D^{20}$ 1.5067) |

TABLE 5—Continued

| | Formula | B.P. ° C./mm.Hg. | (Refractive index) |
|---|---|---|---|
| 2 | CH₃O, ClCH₂CH(CHO)ClCH₂ — P(=O) — O — C₆H₄(CN) (ortho) | ......... | (n_D²⁰ 1.5185). |
| 4 | C₂H₅O, ClCH₂CH(CH₃)O — P(=O) — O — C₆H₃(CN)(Cl) | ......... | (n_D²⁰ 1.5101). |
| 5 | C₂H₅O, ClCH₂CH(CH₃)O — P(=O) — O — C₆H₄—CN (para) | ......... | (n_D²⁰ 1.5053). |
| 6 | C₂H₅O, ClCH₂CH(CH₃)O — P(=O) — O — C₆H₃(Cl)(CN) | 160/0.15 | (n_D²⁰ 1.5082). |
| 7 | C₂H₅O, ClCH₂CH(CH₃)O — P(=O) — O — C₆H₃(CN)(Br) | ......... | (n_D²⁰ 1.5262). |
| 8 | C₂H₅O, ClCH₂CH(CH₂Cl)O — P(=O) — O — C₆H₄(CN) (ortho) | 168–174° C./0.25 | (n_D²⁰ 1.5142). |
| 9 | C₂H₅O, ClCH₂CH(CH₂Cl)O — P(=O) — O — C₆H₃(CN)(Cl) | 187° C./0.25 | (n_D²⁰ 1.5232). |
| 10 | C₂H₅O, ClCH₂CH(CH₂Cl)O — P(=O) — O — C₆H₄—CN | 182° C./0.35 | (n_D²⁰ 1.5163). |
| 11 | C₂H₅O, ClCH₂CH(CH₂Cl)O — P(=O) — O — C₆H₃(Cl)(CN) | 183–186° C./0.3 | (n_D²⁰ 1.5268). |
| 12 | C₂H₅O, ClCH₂CH₂CH(CH₃)O — P(=O) — O — C₆H₄(CN) | 163–165° C./0.25 | (n_D²⁰ 1.5052) |
| 13 | C₂H₅O, ClCH₂CH₂CH(CH₃)O — P(=O) — O — C₆H₃(CN)(Cl) | 163° C./0.1 | (n_D²⁰ 1.5107) |
| 14 | C₂H₅O, ClCH₂CH₂CH(CH₃)O — P(=O) — O — C₆H₃(CN)(CN) | 166° C./0.2 | (n_D²⁰ 1.4944) |

TABLE 5—Continued

| | Formula | Physical properties | |
|---|---|---|---|
| | | B.P. ° C./mm.Hg. | (Refractive index) |
| 15 | 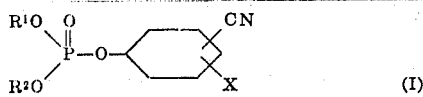 | | ($n_D^{20}$ 1.5170). |
| 16 | | 165–168° C./0.25 | ($n_D^{20}$ 1.4961). |
| 17 | 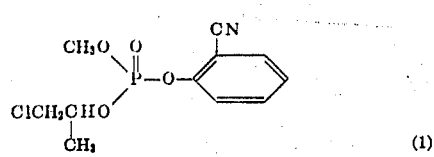 | | ($n_D^{20}$ 1.5008). |

It will be realized by the artisan that all of the foregoing compounds contemplated by the present invention possess the desired fungicidal and insecticidal properties, as well as a comparatively low toxicity toward warm-blooded creatures.

It will be appreciated that the instant specification and examples are set forth by way of illustration and not limitation, and that various modifications and changes may be made without departing from the spirit and scope of the present invention.

What is claimed is:

1. Phosphoric acid esters of the formula $$\begin{array}{c} R^1O \quad O \\ \diagdown \! \! \! \! \! \diagup \\ P \\ \diagup \quad \diagdown \\ R^2O \end{array} - O - \bigcirc \begin{array}{c} CN \\ X \end{array} \qquad (I)$$

in which
R¹ stands for a lower alkyl group,
R² stands for a lower alkyl group substituted by one or two chlorine atoms, and
X stands for a hydrogen or halogen atom, one of —CN and X being in 2-position and the other being in 4-position.

2. Esters according to claim 1 in which R¹ stands for alkyl of 1–3 carbon atoms, R² stands for 1-chloromethyl-ethyl, 1-chloromethyl-2-chloroethyl or 1-methyl-3-chloropropyl and X stands for a hydrogen, chlorine or bromine atom.

3. Ester according to claim 1 wherein such ester is O-methyl-O-(1-chloromethylethyl)-O-(2-cyanophenyl)phosphate of the formula (1)

4. Ester according to claim 1 wherein such ester is O-methyl-O-(1-chloromethyl-2-chloroethyl)-O-(2-cyanophenyl) phosphate of the formula (2)

5. Ester according to claim 1 wherein such ester is O-ethyl-O-(1-chloromethylethyl)-O-(2-cyanophenyl)phosphate of the formula (3)

6. Ester according to claim 1 wherein such ester is O-ethyl-O-(1-chloromethylethyl)-O-(2-cyano-4-chlorophenyl) phosphate of the formula

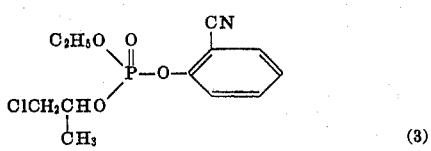
(4)

7. Ester according to claim 1 wherein such ester is O-ethyl-O-(1-chloromethylethyl)-O-(4-cyanophenyl)phosphate of the formula

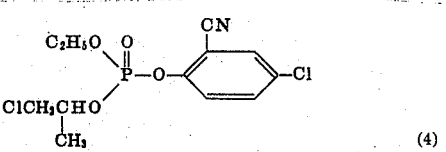
(5)

8. Ester according to claim 1 wherein such ester is O-ethyl-O-(1-chloromethylethyl)-O-(2-chloro-4-cyanophenyl) phosphate of the formula

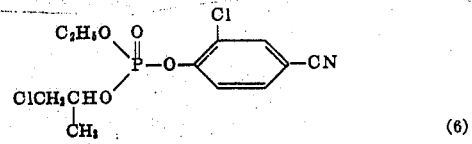
(6)

9. Ester according to claim 1 wherein such ester is O-ethyl-O-(1-chloromethylethyl)-O-(2-cyano-4-bromophenyl)phosphate of the formula

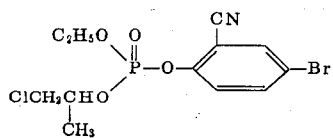

(7)

10. Ester according to claim 1 wherein such ester is O-ethyl-O-(1-chloromethyl-2-chloroethyl)-O-(2-cyanophenyl) phosphate of the formula

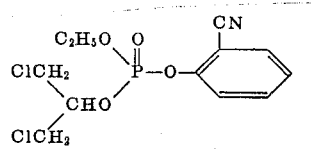

(8)

11. Ester according to claim 1 wherein such ester is O-ethyl-O-(1-chloromethyl-2-chloroethyl)-O-(2-cyano-4-chlorophenyl)phosphate of the formula

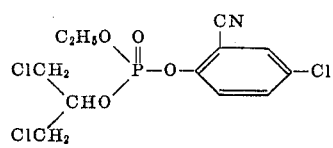

(9)

12. Ester according to claim 1 wherein such ester is O-ethyl-O-(1-methyl-3-chloropropyl)-O-(2-cyanophenyl)phosphate of the formula

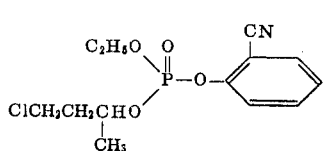

(10)

13. Ester according to claim 1 wherein such ester is O-ethyl-O-(1-methyl-3-chloropropyl)-O-(2-cyano-4-chlorophenyl) phosphate of the formula

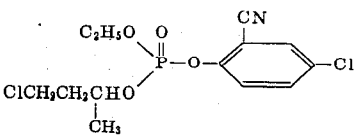

(11)

14. Ester according to claim 1 wherein such ester is O-ethyl-O-(1-methyl-3-chloropropyl)-O-(2-chloro-4-cyanophenyl) phosphate of the formula

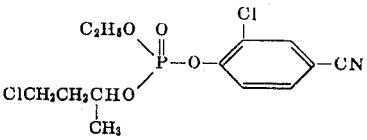

(12)

15. Ester according to claim 1 wherein such ester is O-propyl-O-(1-chloromethylethyl)-O-(2-cyanophenyl)phosphate of the formula

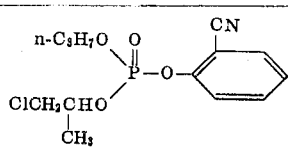

(13)

16. Ester according to claim 1 wherein such ester is O-isopropyl-O-(1-chloromethylethyl)-O-(2-cyanophenyl)phosphate of the formula

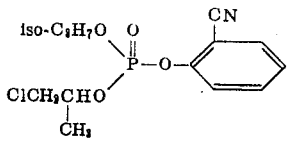

(14)

* * * * *

UNITED STATES PATENT OFFICE
CERTIFICATE OF CORRECTION

Patent No. 3,758,647           Dated September 11, 1973

Inventor(s) SHIGEO KISHINO, ET. AL.

It is certified that error appears in the above-identified patent and that said Letters Patent are hereby corrected as shown below:

Column 5, line 3, correct spelling of "agricultural"

Column 10, line 49, in the formula - change "CH" to

-- CN -- .

Column 11, composition 14, cancel "CN" at the top of the benzene ring.

Signed and sealed this 23rd day of July 1974.

(SEAL)
Attest:

McCOY M. GIBSON, JR.         C. MARSHALL DANN
Attesting Officer            Commissioner of Patents